United States Patent
Su

(10) Patent No.: US 7,653,676 B2
(45) Date of Patent: Jan. 26, 2010

(54) EFFICIENT MAPPING OF FFT TO A RECONFIGURABLE PARALLEL AND PIPELINE DATA FLOW MACHINE

(75) Inventor: Hua-Ching Su, Milpitas, CA (US)

(73) Assignee: Hitachi, Ltd., Tokyo (JP)

( * ) Notice: Subject to any disclaimer, the term of this patent is extended or adjusted under 35 U.S.C. 154(b) by 802 days.

(21) Appl. No.: 11/429,068

(22) Filed: May 5, 2006

(65) Prior Publication Data

US 2007/0260660 A1  Nov. 8, 2007

(51) Int. Cl.
*G06F 17/14* (2006.01)

(52) U.S. Cl. ..................... 708/404
(58) Field of Classification Search .............. None
See application file for complete search history.

(56) References Cited

U.S. PATENT DOCUMENTS

| | | | |
|---|---|---|---|
| 5,293,330 A | | 3/1994 | Sayegh |
| 5,831,883 A | | 11/1998 | Suter et al. |
| 6,061,406 A | | 5/2000 | Carson et al. |
| 6,434,583 B1 | | 8/2002 | Dapper et al. |
| 6,658,441 B1 | | 12/2003 | Kim |
| 6,917,955 B1 * | | 7/2005 | Botchev ............. 708/406 |
| 7,024,442 B2 * | | 4/2006 | Yamamoto et al. ....... 708/404 |
| 2003/0050945 A1 | | 3/2003 | Chen et al. |
| 2004/0030736 A1 * | | 2/2004 | Scheuermann ........... 708/402 |
| 2006/0224651 A1 * | | 10/2006 | Madhavapeddi et al. .... 708/404 |

OTHER PUBLICATIONS

Paul M. Heysters, Gerard J.M. Smit; Mapping of DSP Algorithms on the Montium Architecture; The Institute of Electrical and Electronics Engineers, Inc. © 2003; p. 180.

* cited by examiner

*Primary Examiner*—David H Malzahn
(74) *Attorney, Agent, or Firm*—Mattingly & Malur, P.C.

(57) ABSTRACT

A system comprises first and second local memory banks; and a reconfigurable ALU array having multiple configurations including: a first for performing an inverse butterfly operation, a second for performing a multiplication operation, a third for performing parallel subtraction and addition, and a fourth for performing an inverse N-point shuffle. The ALU array may obtain input for the inverse butterfly operation from the first bank and store output in the second bank. The ALU array may obtain input for the multiplication operation from the second bank and store output in the first bank. The ALU array may obtain input for the parallel subtraction and addition operation from the first bank and store output in the second bank. The ALU array may obtain input for the N-point inverse shuffle from the second bank and store output in the first bank. The system may further comprise a bit reversal block.

13 Claims, 18 Drawing Sheets

Abstract Model of One Stage of N-Point FFT on a Reconfigurable 8x4 ALU cell array architecture.

Butterfly Used in an Inverted Raw FFT network

N-Point shuffle and Inverse Shuffle (N=2^m)

A Pipeline Implementation of an N-point
IFFT (N = 2^m)

Abstract Model of One Stage of N-Point FFT on a Reconfigurable 8x4 ALU cell array architecture.

DFG for a 0-angle Inverse Butterfly (BT0_N)

DFG for N-Point Inverse Shuffle (1 of 2)

DFG for N-Point Inverse Shuffle (2 of 2)

Bank 0

| row | 0 — 511 |
|---|---|
| 0 | xr(k).lo |
| 1 | xr(k).hi |
| 2 | xi(k).lo |
| 3 | xr(k).hi |
| 4 | xr(k+N/2).lo |
| 5 | xr(k+N/2).hi |
| 6 | xi(k+N/2).lo |
| 7 | xi(k+N/2).hi |
| 8 | wr(k).lo |
| 9 | wr(k).hi |

Bank 1

| row | 0 — 511 |
|---|---|
| 0 |  |
| 1 |  |
| 2 |  |
| 3 |  |
| 4 |  |
| 5 |  |
| 6 |  |
| 7 |  |
| 8 | wi(k).lo |
| 9 | wi(k).hi |

Local RAMs Map for Initial N Data Points and
Weight Constants

FIG. 9

Contents of local RAMs at Step (A) - BT0_N

Contents of local RAMs at Step (B) - MULT32

Contents of local RAMs at Step (C) - MULT32

Contents of local RAMs at Step (D) - MULT32

Contents of local RAMs at Step (E) - MULT32

Contents of local RAMs at Step (F) – Sub & Add

Contents of local RAMs at Step (G) - N-Point Inverse Shuffle

Flow Graph for a 16-point FFT (bit sliced)

EFFICIENT MAPPING OF FFT TO A RECONFIGURABLE PARALLEL AND PIPELINE DATA FLOW MACHINE

TECHNICAL FIELD

Embodiments described herein relate generally to systems and methods for performing Fast Fourier Transforms.

BACKGROUND

Fast Fourier Transforms (FFTs) and Inverse Fast Fourier Transforms (IFFTs) are widely used in many signal processing applications. An FFT traditionally operates on data points and obtains Fourier coefficients. An IFFT traditionally operates on Fourier coefficients and recovers the data points. Modern applications, e.g., mobile devices, require an implementation that is efficient, flexible and low cost.

Existing solutions fail to satisfy these needs. While software FFT and IFFT solutions for general-purpose sequential processors and digital signal processors are inexpensive and flexible, they are generally inefficient. When the number of data points to compute an FFT or IFFT is small or fixed, traditional hardware can implement an efficient FFT or IFFT. However, such an implementation is usually expensive and highly inflexible. When the number of data points to compute an FFT or IFFT is large or variable, hardware implementations have been unavailable.

Meanwhile, technology based on reconfigurable pipelined and parallel computing architecture which promises to support high performance computing is emerging. Such architecture typically uses reconfigurable arrays of processing elements. Mapping an FFT or IFFT to this emerging architecture is a nontrivial exercise, especially for implementations that manage a large or variable number of data points.

SUMMARY

According to one embodiment, the present invention provides a system, comprising first and second local memory banks; an 8×4 reconfigurable arithmetic logic unit array (referred to as the ALU array hereafter) coupled to the local memory banks, the ALU array having a plurality of configurations, including: a first configuration for performing an inverse butterfly operation; a second configuration for performing a multiplication operation; a third configuration for performing parallel subtraction and addition; and a fourth configuration for performing an inverse N-point shuffle. The ALU array may obtain the input data for the inverse butterfly operation from the first local memory bank and may store output data in the second local memory bank. The ALU array may obtain the input data for the multiplication operation from the second local memory bank and may store the output data in the first local memory bank. The ALU array may obtain the input data for the parallel subtraction and addition operation from the first local memory bank and may store the output data in the second local memory bank. The ALU array may obtain the input data for the inverse N-point shuffle (or sometimes called the N-point inverse shuffle, e.g., in FIG. 4, FIG. 8A and FIG. 8B) from the second local memory bank and may store the output data in the first local memory bank. The system may further comprise a bit reversal block.

According to another embodiment, the present invention provides a method, comprising using the ALU array in a first configuration to perform an inverse butterfly operation; using the ALU array in a second configuration to perform a multiplication operation; using the ALU array in a third configuration to perform a parallel addition and subtraction operation; and using the ALU array in a fourth configuration to perform an inverse N-point shuffle. The method may further comprise obtaining input data for the inverse butterfly operation from the first local memory bank and storing output data in the second local memory bank, obtaining input data for the multiplication operation from the second local memory bank and storing output data in the first local memory bank, obtaining input data for the parallel subtraction and addition operation from the first local memory bank and storing output data in the second local memory bank, and/or obtaining input data for the inverse N-point shuffle from the second local memory bank and storing output data in the first local memory bank. The method may further comprise performing a bit reversal.

In accordance with one embodiment, a circuit includes a first memory bank, a plurality of butterflies, a second memory bank, and a data reorganizer. The first memory bank is suitable for storing a received plurality of data values. The plurality of butterflies is suitable for performing either N-point Fast Fourier Transforms (FFTs) or N-point Inverse Fast Fourier Transforms (IFFTs) upon the received plurality of data values in the first memory bank to calculate data values. The plurality of butterflies is also suitable for storing the calculated data values in the second memory bank. The data reorganizer, which may be bit reversal module or a shuffle module, is suitable for overwriting the received data values in the first memory bank with the calculated data values so that the calculated data values are in a different order than the calculated data values in the second memory bank. The plurality of butterflies and the data reorganizer are operative to execute iteratively m times, where m=$\log_2$(number of the received plurality of data values), until the initial data values are transformed into Fourier Coefficients.

In accordance with other embodiment, a system and method for implementing a generic inverse butterfly and inverse N-point shuffle may be implemented. The system can include a first and second local memory banks and a reconfigurable ALU array coupled to the local memory banks. The ALU array can have a plurality of configurations for performing generic inverse butterfly and inverse N-point shuffle operations. These configurations may include a first configuration for performing a zero-angle inverse butterfly step of the generic inverse butterfly and a second configuration for performing a plurality of multiplication steps of the generic inverse butterfly. The configurations may also include a third configuration for performing a parallel subtraction and addition step of the generic inverse butterfly and a fourth configuration for performing the inverse N-point shuffle. In the method for implementing a generic inverse butterfly and inverse N-point shuffle, a zero-angle inverse butterfly step of the generic inverse butterfly may first be performed using the reconfigurable ALU array in a first configuration. Next, the reconfigurable ALU array may be reconfigured into a second configuration and used to perform plurality of multiplication steps of the generic inverse butterfly. Subsequently, the ALU array may be reconfigured a third time into a third configuration for performing a parallel addition and subtraction step of the generic inverse butterfly. The ALU array may be reconfigured in a fourth configuration to perform the inverse N-point shuffle.

BRIEF DESCRIPTION OF THE DRAWINGS

FIG. 9 is an exemplary memory map of two memory banks of local RAM for an initial N data points and weight constants;

DETAILED DESCRIPTION

Embodiments herein describe an efficient implementation of a Fast Fourier Transform (FFT) and an Inverse FFT (IFFT) for large and/or variable number of data points under limited reconfigurable pipeline and parallel hardware resource constraints. Embodiments achieve high speed and accuracy. Embodiments can provide an efficient mapping to a dynamic reconfigurable 16-bit 8 by 4 array architecture, while maintaining accuracy and performance.

It will be appreciated that the inverse of a normalized FFT is a raw FFT. Thus, the FFT circuit can be executed backward to generate an IFFT.

Figure 1:
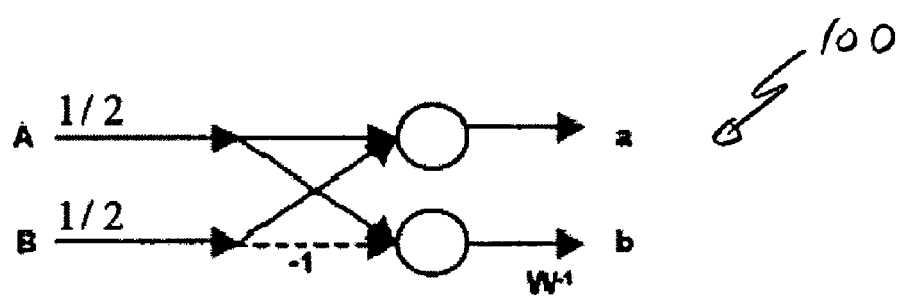
FIG. 1 is a block diagram of a butterfly used in an inverted raw FFT network, in accordance with an embodiment.

An FFT or IFFT has traditionally been performed using butterfly circuits (sometimes referred to as a "butterfly"). An example butterfly is a simple circuit that adds and subtracts a first complex input a and product of a second complex input b with a complex weigh w. FIG. 1 shows an example inverse butterfly circuit 100. The inverse butterfly circuit 100 multiplies each complex number A and B by ½, at the top circle adds them together to generate a=A/2+B/2, at the bottom circle subtracts them to generate b/W$^{-1}$=A/2−B/2 {or b=(A/2−B/2)*W$^{-1}$}. The results of a butterfly and an inverse butterfly, divided based on real and imaginary components, are provided in the table below:

| | Butterfly | Inverse Butterfly |
|---|---|---|
| Complex | $A = a + Wb$<br>$B = a - Wb$ | $a = \frac{A}{2} + \frac{B}{2}$<br>$b = \left(\frac{A}{2} - \frac{B}{2}\right)W$ |
| Real | $A_b = a_b + (W_b \cdot b_b - W_r \cdot b_r)$<br>$B_b = a_b - (W_b \cdot b_b - W_r \cdot b_r)$<br>$A_r = a_r + (W_b \cdot b_r + W_r \cdot b_b)$<br>$B_r = a_r - (W_b \cdot b_r + W_r \cdot b_b)$ | $a_b = \frac{A_b}{2} + \frac{B_b}{2}$<br>$a_r = \frac{A_r}{2} + \frac{B_r}{2}$<br>$b_r = \left(\frac{A_b}{2} - \frac{B_b}{2}\right)W_b + \left(\frac{A_r}{2} - \frac{B_r}{2}\right)W_r$<br>$b_r = \left(\frac{A_r}{2} - \frac{B_r}{2}\right)W_b - \left(\frac{A_b}{2} - \frac{B_b}{2}\right)W_r$ |

The inverse butterfly equations of the above table can be rewritten. That is, the complex formulas for the inverse butterfly using complex number representation are:

$$a = A/2 + B/2 \qquad \text{Eq1}$$

$$b = (A/2 - B/2)W^{-1} \qquad \text{Eq2}$$

The real formula for the inverse butterfly using real numbers to represent the complex formula above are:

| | | |
|---|---|---|
| $a_r = A_r/2 + B_r/2$ | Eq11 | real part |
| $a_i = A_i/2 + B_i/2$ | Eq12 | imaginary part |
| $b_r = (A_r/2 - B_r/2)W_r + (A_i/2 + B_i/2)W_i$ | Eq21 | real part |
| $b_i = (A_i/2 - B_i/2)W_r + (A_r/2 + B_r/2)W_i$ | Eq22 | imaginary part |

Figure 2:
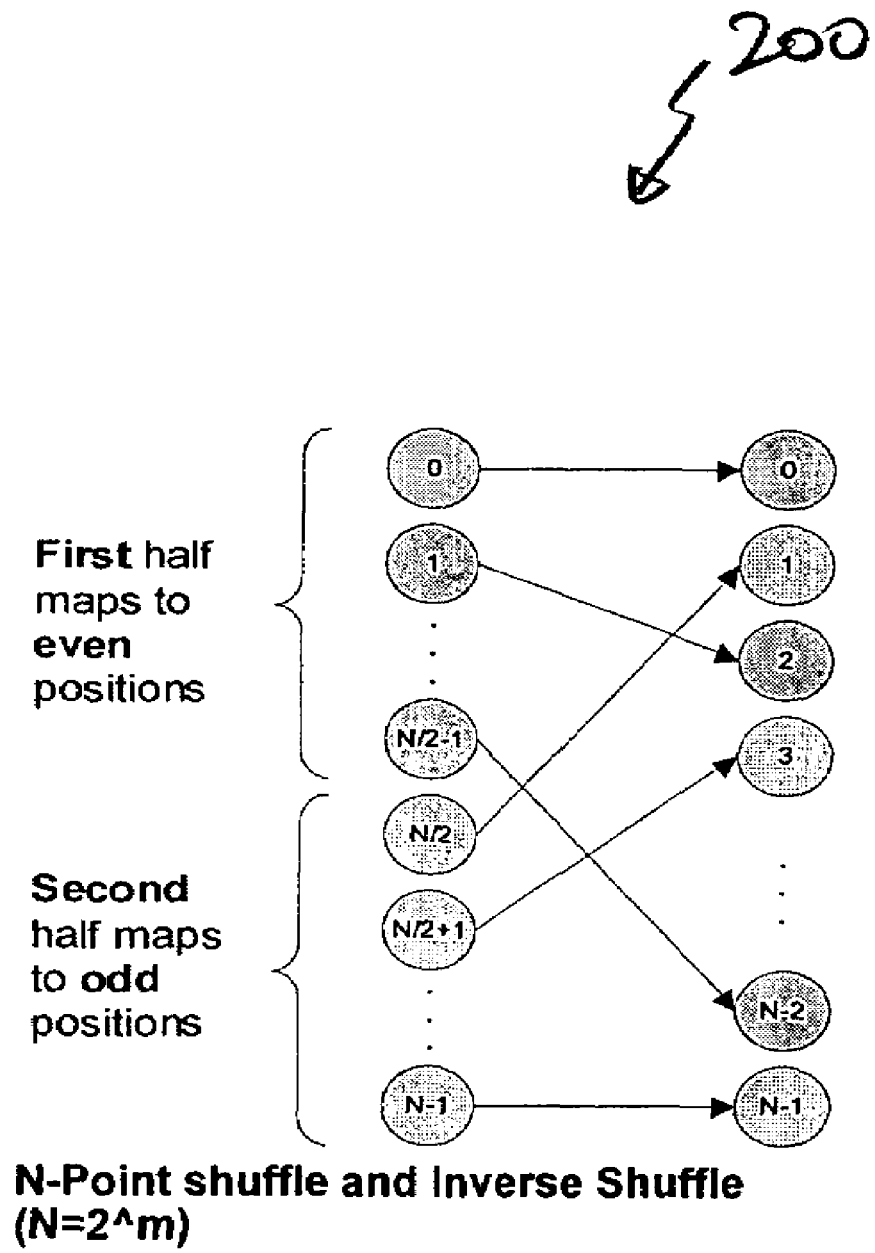
FIG. 2 describes how data points are reorganized in an N-point shuffle and inverse shuffle, in accordance with an embodiment.

An FFT may use a shuffle block, and an IFFT may use an inverse shuffle block. FIG. 2 illustrates an example N-point shuffle block 200. If viewed backwards, example N-point shuffle block 200 is an N-point inverse shuffle. For a shuffle, the first half of the data values at the first N/2 positions are shifted to the even positions, and the second half of the data values at the second N/2 positions are shifted to the odd positions. For an inverse shuffle, the data values in the even positions are shifted to the first N/2 positions, and the data values in the odd positions are shifted to the second N/2 positions.

Figure 3:
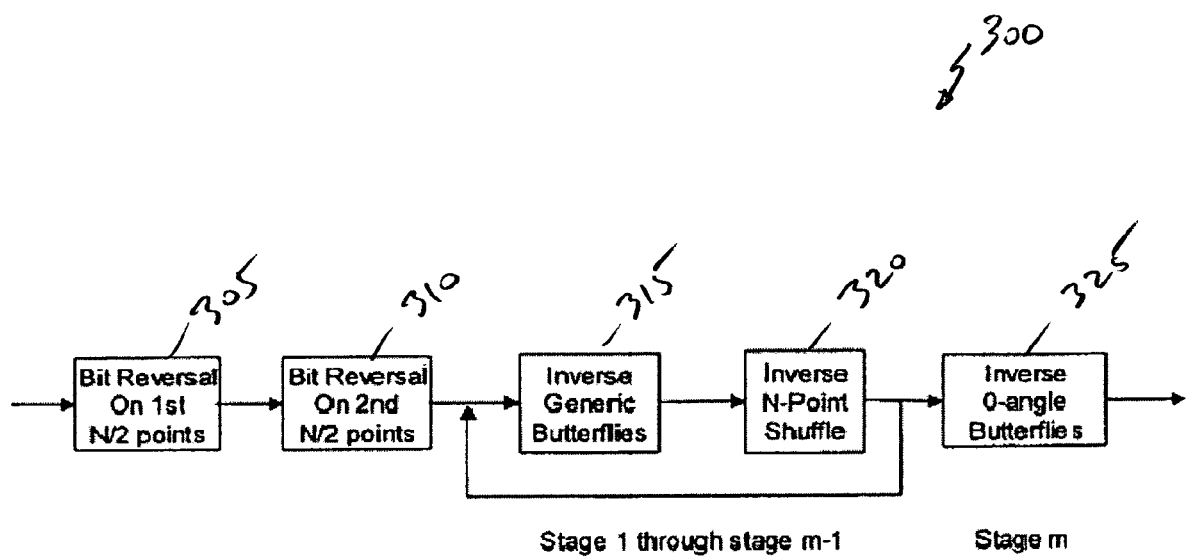
FIG. 3 is a block diagram that shows a pipeline implementation of an N-point IFFT, in accordance with an embodiment.

FIG. 3 shows a pipeline 300 of an N-point IFFT, where $N=2^m$ ($m=\log_2 N$). The pipeline 300 includes a first bit reversal block 305 for the first N/2 points, a second bit reversal block 310 for the second N/2 points, a sub-pipeline that consists of an inverse generic butterfly block 315, an inverse N-point shuffle block 320 and an inverse 0-angle butterfly block 325. The sub-pipeline may be repeated for m−1 times.

In the first bit reversal block 305, bit reversal is performed on the first set of N/2 data points at the first N/2 positions. In the second bit reversal block 310, bit reversal is performed on the second set of N/2 data points at the second N/2 positions. The bit reversals by the bit reversal blocks 305 and 310 could be implemented in a host machine.

In the inverse generic butterfly block 315, the data points from the first N/2 positions are butterflied with the data points from the second N/2 positions. If N=64, then the inverse butterfly block 315 comprises 32 butterflies, each of which receives two data points.

An inverse N-point shuffle block 320 performs an inverse N-point shuffle of the data values in each of the positions. That is, the data points in the even positions are moved to the first N/2 positions, and the data points in the odd positions are moved to the second N/2 positions.

The inverse generic butterfly block 315 and the inverse N-point shuffle block 320 are repeated until these blocks 315 and 320 have been executed for a total of m−1 times. In a 1024-point FFT, m=10 (since $2^{10}$=1024). Accordingly, the blocks 315 and 320 will be executed nine times.

The inverse 0-angle butterfly block 325 completes the IFFT.

The inverse generic butterflies, inverse N-point shuffles, and inverse 0-angle butterflies can be implemented on a 16-bit processor despite the fact that each data point may have more than 16-bits. Many computer systems use 16-bit ALUs within their processors. Such 16-bit processors are capable of performing addition and multiplication on 16-bit numbers. However, such processors cannot perform with accuracy on N-bit numbers, where N is greater than 16, e.g., on 32-bit numbers or 64-bit numbers. For example, each 64-bit number may be regarded as four 16-bit numbers: a low-order real part, a high-order real part, a low-order imaginary part, and a high-order imaginary part. Each block can receive eight 16-bit numbers: four 16-bit numbers for the first data point and the four 16-bit numbers for the second data point. Each butterfly block may also receive four 16-bit numbers for the twiddle factor.

Figure 4:
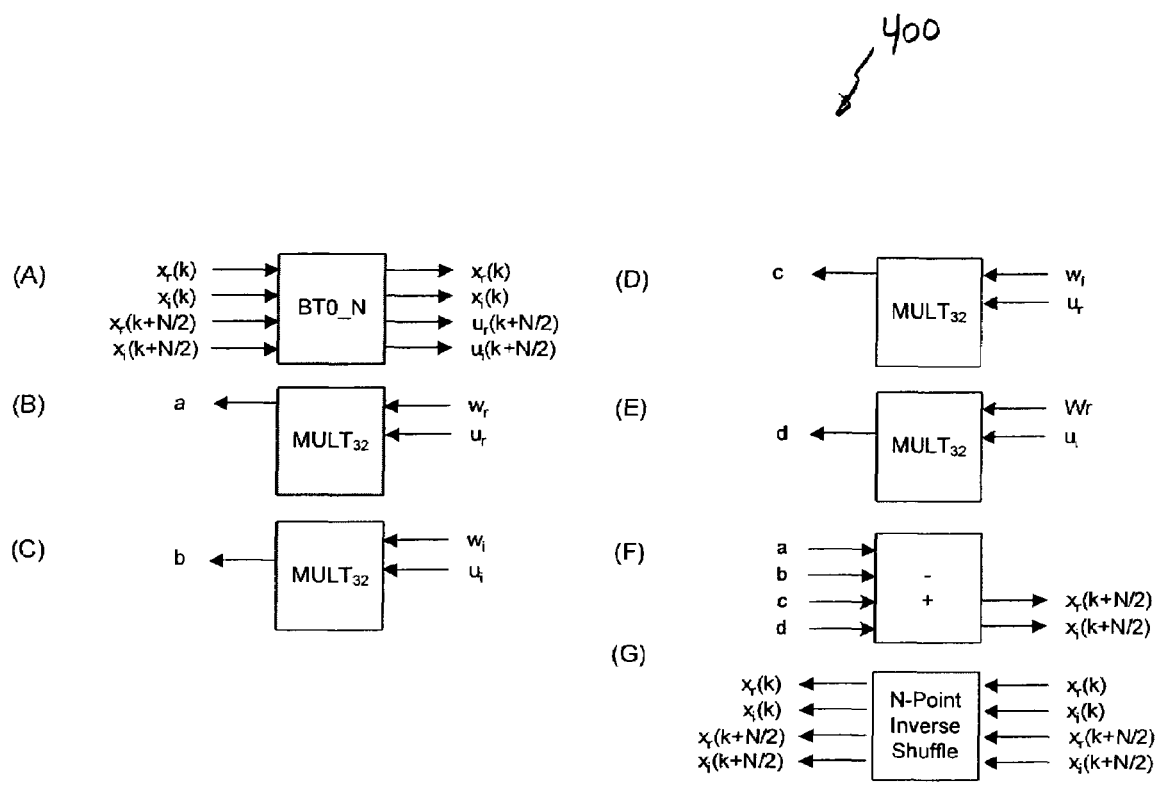
FIG. 4 shows an abstract model of one stage of an N-point FFT on a reconfigurable 8×4 ALU cell array architecture, in accordance with an embodiment.

FIG. 4 shows an abstract model 400 of the inverse generic butterfly block 315 and inverse N-point shuffle block 320 of an N-point FFT on a reconfigurable 8×4 ALU cell array architecture, in accordance with an embodiment. With the model 400, an inverse generic butterfly step can be spread into six separate steps: steps (A), (B), (C), (D), (E) and (F). N-point shuffle block 320 is executed in step G which requires 2 configurations (The model 400 is based on a 16-bit parallel data flow engine, with a local I/O subsystem offering two banks of ten CRAMS, each having a size of 512 words, a load and store cells array, and a crossbar network communicating with load and store cells with the data access to local memory.)

The correspondence between formulas discussed with reference to the table above are provided below:

In Eq21 and Eq22 above, $b_r=(A_r/2-B_r/2)W_r+(A_i/2+B_i/2)W_i$ $b_i=(A_i/2-B_i/2)W_r+(A_r/2+B_r/2)W_i$ Let $U_r$ denote $(A_r/2-B_r/2)$, and $U_i$ denote $(A_i/2+B_i/2)$, then $b_r=(A_r/2-B_r/2)W_r+(A_i/2+B_i/2)W_i=U_rW_r+U_iW_i$, and $b_i=(A_i/2-B_i/2)W_r+(A_r/2+B_r/2)W_i=U_iW_r-U_rW_i$ Steps (A) to (F) of FIG. 4 essentially compute the real formula for the inverse butterfly, that is, $a_r=A_r/2+B_r/2$, $a_i=A_i/2+B_i/2$, $b_r=U_rW_r+U_iW_i$, and $b_r=U_iW_r-U_rW_i$.

Note that, in steps (A) to (G), all input and output variables from or to the boxes represent a sequence of numbers, so that the input numbers are like streams of input to the box, and the output of the box is like a stream of output data flow from the pipeline (the ALU array) until the last item of data of the sequence has been processed in the pipe. Also note that the intermediate values a, b, c, d in steps (C) to (F) used for should not be confused with the sequence of data points in the real formula of the inverse butterfly.

So, the input and output corresponds to the variables of real formula for the inverse butterfly as follows:

In step A, BT0_N is an abstract 8×4 ALU cell array map for computing 0-angle inverse butterflies. Function BT0_N is loaded into reconfigurable ALU cell array. For Step (A):

$x_r(k)$-->BT0_N-->$x_r(k)$ corresponds to $A_r$-->BT0_N-->$a_r$ $x_i(k)$-->BT0_N-->$x_i(k)$ corresponds to $A_i$-->BT0_N-->$a_i$ $x_r(k+N/2)$-->BT0_N-->$x_r(k)$ corresponds to $B_r$-->BT0_N-->$b_r$ $x_i(k+N/2)$ -->BT0_N -->$x_i(k)$ corresponds to $B_i$-->BT0_N-->$b_i$ In steps B-E, MULT32 computes two 32-bit numbers using 16-bit multiplication operations. The array is reconfigured for the function "MULT32." Steps B, C, D and E use the same MULT32 configuration for the array. As a result, there is no need to reconfigure the array between these steps, thereby saving overhead. Step (B) computes $U_r W_r$ and stores the result in temp store a. Step (C) computes $U_i W_i$ and stores the result in temp store b. Step (D) computes $U_r W_i$ and stores the result in temp store c. Step (E) computes $U_i W_r$ and stores result in temp store d.

a<--$MULT_{32}$<---$w_r$ corresponds to a=$U_r W_r$
    <---$u_r$ b<--$MULT_{32}$<---$w_i$ corresponds to b=$U_i W_i$
    <---$u_i$ c<--$MULT_{32}$<---$w_i$ corresponds to c=$U_r W_i$
    <---$u_r$ d<--$MULT_{32}$<---$w_r$ corresponds to d=$U_i W_r$
    <---$u_i$ In step (F), the array is loaded with a "−/+" configuration to allow computing 32-bit subtraction and addition in parallel. Step (F) computes (a−b), (c+d) to obtain $b_r$ and $b_i$ of Eq21.

a-->
b-->−
c-->+-->$x_r(k+N/2)$ corresponds to $b_r$ (in Eq21)
d--> -->$w_i(k+N/2)$ corresponds to $b_i$ (in Eq21)

Specifically: $x_r(k)$=16×(xr.k.hi)+xr.k.lo, xi(k)=16×(xi.k.hi)+xi.k.lo, $u_r$=16×(ur.k.hi)+ur.k.lo, and $u_r$=16×(ui.k.hi)+ui.k.lo, where xr.k.hi, xr.k.lo, xi.k.hi, xi.k.lo, ur.k.hi, ur.k.lo, ui.k.hi, and ui.k.lo are each a 16-bit number.

An intermediate value u may be defined such that u(k+N/2) is the second half of the input complex number sequence, k=0,1, ... (N/2)−1.

$u_r(k+N/2)$ is real part of the complex number sequence computed based on the formula for the inverse butterfly described in the table above, which is $(A_r/2-B_r/2)$ and ui=$((A_i/2-B_i/2)$ where $A_i$ is the imaginary part of first half of the input of complex number sequence, and $B_r$ represents the second half of the input of complex sequence.

In step (A), BT0_N is performed to compute the intermediate value u based upon two data points, i.e. x(k) and x(k+N/2). Thus, in a first ALU cycle, two data points are combined to provide an intermediate variable u.

In steps (B)-(E) intermediate values a, b, c, and d are generated, respectively.

In step (F), the intermediate variables a, b, c, and d are combined to provide data values x(k) and x(k+N/2) as input to the inverse N-point shuffle block 325.

In step (G), the data values are shuffled per the inverse N-point shuffle block 320.

FIGS. 5-8B are data flow graphs for the sub-steps of model 400, e.g., sub-steps (A)-(G). On each side of the array, a local memory bank (e.g., CRAM Bank 0 or CRAM Bank 1) is provided with an array of load and store elements (identified as "LS") that interface between the array and the local memory banks. Communication between LS elements and CRAM can be accomplished through a crossbar network I/O subsystem.

In the figures, rectangles represent executable cells with operations denoted in the encircled shapes. For example, in FIG. 5, an oval labeled as "L>>1" represents performing a logic shift 1-bit right on the input data. As another example, an oval labeled as "PTHR' indicates that a pair of input data is routed through that cell. The operation "U-" represents executing an unsigned subtraction on the input operands. The dark rectangular blocks represent one cycle delay, used for synchronizing purposes. Elements in the format "---->" denotes a 1-bit quantity. The symbol "OR0" represents an OR function with 0. The input data streams can be loaded in 16-bit quantities through LS cell operations "LDINCA" which, in every clock cycle loads data from a given address. A LS cell operation "STINCA" represents storing of data (i.e., data output from the ALU) in a local memory bank cell.

Step A—BT0_N:

Step (A) is discussed in greater detail with reference to FIG. 5. In step A, the reconfigurable ALU array receives eight 16-bit data words on eight 16-bit data buses. The eight 16-bit words represent the low-order real part of x(k), the high-order real part of x(k), the low-order imaginary part of x(k), the high-order imaginary part of x(k), the low-order real part of x(k+N/2), the high-order real part of x(k+N/2), the low-order imaginary part of x(k+N/2), and the high-order imaginary part of x(k+N/2). If N=1024, when k=0, the eight 16-bit words represent the low-order real part of x(0), the high-order real part of x(0), the low-order imaginary part of x(0), the high-order imaginary part of x(0), the low-order real part of x(512), the high-order real part of x(512), the low-order imaginary part of x(512), and the high-order imaginary part of x(512).

Figure 5:
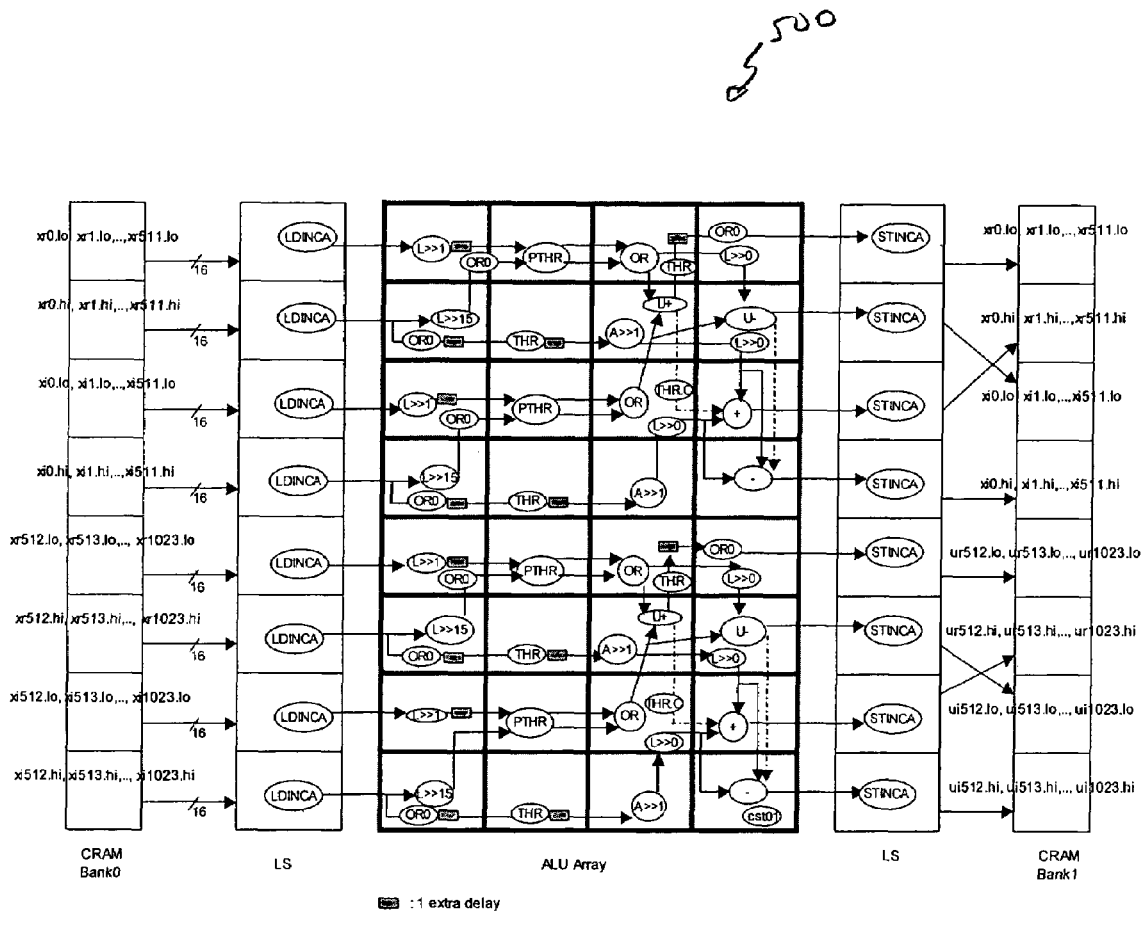
FIG. 5 is a data flow graph of an exemplary 0-angle inverse butterfly (BT0_N), in accordance with an embodiment.

FIG. 5 shows a data flow graph for BT0_N, i.e., a 0-angle inverse butterfly (i.e., a butterfly with theta=0 for a given N). 1024 data points are stored in CRAMs. The BT0_N receives the 1024 data points broken into two groups of 512 data points, such that the real parts are arranged in a first pipeline and the imaginary parts are arranged in a second pipeline. The data-flow graph represents the 8×4 ALU cell array map (i.e., the hardware configuration of the ALU array) for computing 0-angle inverse butterflies. This configuration may also used as part of the computation for non-trivial butterflies, which are butterflies of a non-zero degree angle.

Eight 16-bit data buses provide a low-order real part of x (i.e., a data point) taken from the first pipeline, the high-order real part of x taken from the first pipeline, a low-order imaginary part of x taken from the first pipeline, the high-order imaginary part of x taken from the first pipeline, a low-order real part of x (i.e., a data point) taken from the second pipeline, the high-order real part of x taken from the second pipeline, a low-order imaginary part of x taken from the second pipeline, and the high-order imaginary part of x taken from the second pipeline.

Initial latency is 16 cycles and the size of data set is 512, so total cycle count for step (A) is 528 cycles.

Steps B-E—MULT32:

In steps (B)-(E), the array receives four 16-bit words on four 16-bit data buses. Although both u and w are complex numbers, each 16-bit word of each part of each complex number is handled separately. Thus, in step (B), intermediate variable "a" is calculated by multiplying $w_r$ by $u_r$; in step (C), intermediate variable "b" is calculated by multiplying $w_i$ by $u_i$, in step (D), intermediate variable "c" is calculated by multiplying $w_i$ by $u_r$, and in step (E), intermediate variable "d" is calculated by multiplying $w_r$ by $u_i$.

Figure 6:
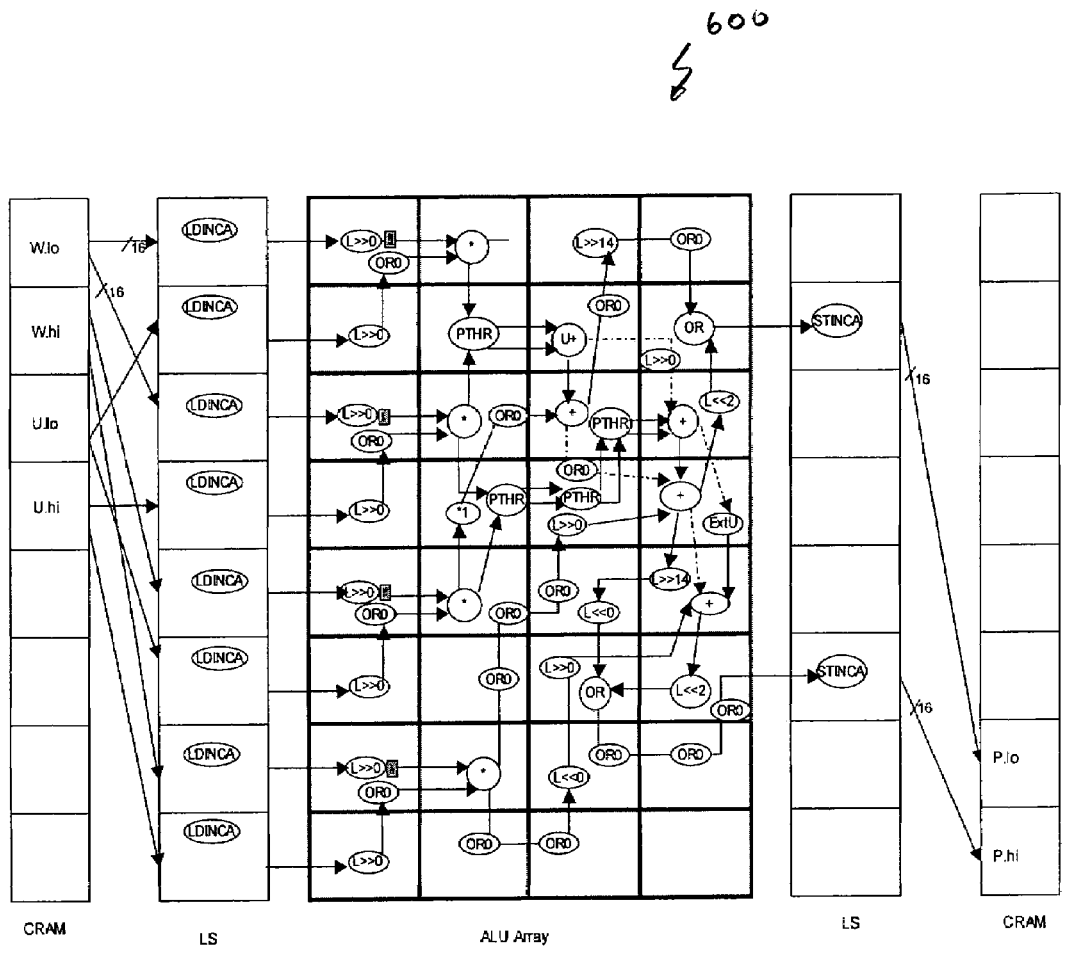
FIG. 6 is a data flow graph of an exemplary multiplier circuit (MULT32), in accordance with an embodiment.

FIG. 6 shows an implementation for each of steps (B), (C), (D), and (E) in greater detail. The array 600 receives a low-order 16-bit value and a high-order 16-bit value that collectively define a 32-bit number that is either the real part or the imaginary part of the twiddle factor w. Similarly, array 600 receives a low-order 16-bit value and a high-order 16-bit value that collectively define a 32-bit number that is either the real part or the imaginary part of the intermediate variable u.

In the second column of the array, four multiplications calculate a low-order and a high-order word of a product's real part and a low-order and a high-order word of the product's imaginary part. It will be appreciated that, with each input data point of 64-bits using a 16-bit architecture, implementing a high accuracy FFT can be tedious and challenging because the multiplication of two 32-bit numbers results in a 64-bit product even though a 32-bit result is required. To obtain the best 32 bits of information among these 64 bits without losing of the quality, bits 30 to 61 can be extracted from the 64-bit product as the 32-bit result. However, this imposes extra logic for SHIFTings and ORings in the design of a MUL32 map and complicates the overall mapping design further if they cannot be implemented in the same configuration page. The intermediate results during multiplication need to be saved in free local memories and then reloaded for the next configuration, which will continue the unfinished part of the multiplication. The resulting bytes can then be re-assembled with partial result of the previous configuration execution to form the final 32-bit result. The array 600 computes multiplication of two 32-bit numbers using a 16-bit multiplier. The 64-bit result of the multiplication is then reduced to the final product of 32 bits, taken from bit 29 to bit 61.

In the MULT32 configuration, multiplication of two 32-bit numbers is performed to produce one 32-bit product. The inputs are as follows:

W.lo represents: low-order 16 bits of the weight sequence W of either the real part, that is w, if computing step (B) and step (E), or imaginary part that is $w_i$ if computing step (C) and step (D). In other word, that is, $w_r$0.lo, $w_r$1.lo, $w_r$2.lo, ..., $w_r$511.lo for steps (B) and (E). Or $w_i$0.lo, $w_i$1.lo, $w_i$2.lo, ..., $w_i$511. for steps (C) and step (D);

Similarly W.hi represents: high-order 16 bits of the weight sequence W, that is, $w_r$0.hi, $w_r$1.hi, $w_r$2.hi, ..., $w_r$511.hi if computing step (B) and step (E). Or $w_i$0.hi, $w_i$1.hi, $w_i$2.hi, ..., $w_i$511.hi if computing step (C) and step (D);

U.lo represents: Similarly, $u_r$0.lo, $U_r$1.lo, $u_r$2.lo, ..., $u_r$511.lo for steps (B) and (D). Or $u_i$0.lo., $u_i$1.lo, $u_i$2.lo, ..., $u_i$511.lo for steps (C) and (E), and U.hi represents: Similarly, $u_r$0.hi, $u_r$1.hi, $u_r$2.hi, ..., $u_r$511.hi for steps (B) and (D). Or $u_i$0.hi., $u_i$1.hi, $u_i$2.hi, ..., $u_i$511.hi for steps (C) and (E).

The outputs are as follows:

P.lo represents: either one of the following complex number sequence a0.lo, a1.lo, ..., a511.lo after computing step (B), or b0.lo, b1.lo, ..., b511.lo after computing step (C), or c0.lo, c1.lo, . . . , c511.lo after computing step (D), or
d0.lo, d1.lo, . . . , d511.lo after computing step (E); and
P.hi represents: either one of the following complex number sequence
a0.hi, a1.hi, . . . , a511.hi after computing setp (B), or
b0.hi, b1.lo, . . . , b511.hi after computing step (C), or
c0.hi, c1.lo, . . . , c511.hi after computing step (D), or
d0.hi, d1.hi, . . . , d511.hi after computing step (E)

The product spreads in 2 words, P.lo denotes low order 16 bits of the 32-bit product; P.hi denotes high order 16 bits of the 32-bit product.

In exemplary array 600, the initial latency equals 22 cycles and the size of data set=512. Thus, the total cycle count=534 cycles.

Figure 7:
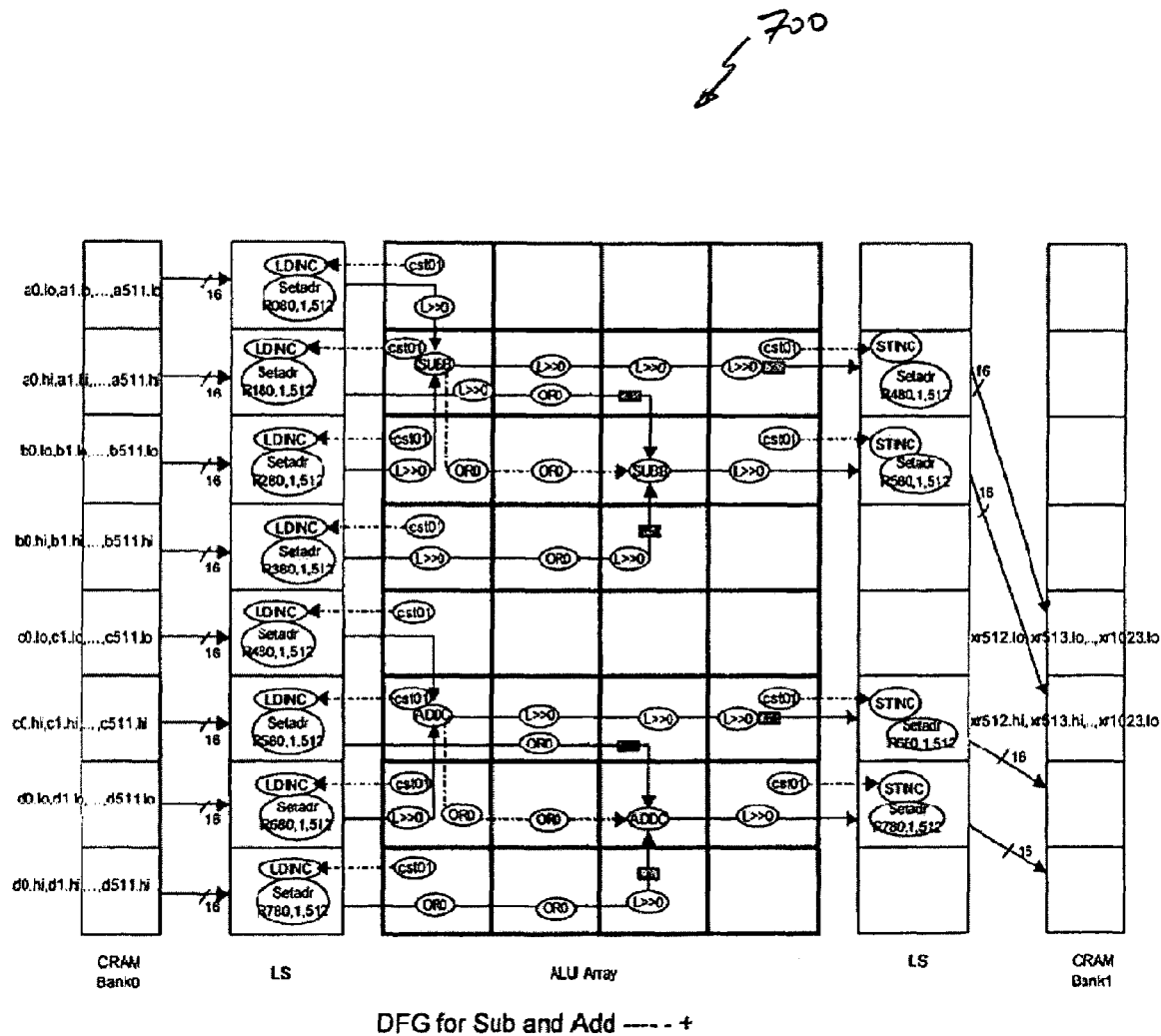
FIG. 7 is a data flow graph of an exemplary addition/subtraction circuit, in accordance with an embodiment.

Step F—Subtract and Add:

FIG. 7 shows a data flow graph for a circuit 700 to implement step (F). Each of the values a, b, c, and d is broken into a high-order 16-bit number and a low-order 16-bit number, each of which is processed independently. Accordingly, the circuit 700 efficiently uses legacy 16-bit ALUs to perform arithmetic and Boolean operations.

The subtraction and addition are executed in parallel with a pair of 32-bit data values. The subtraction operations are carried out in the cells of the top four rows of the ALU array, and the addition operation are carried out in the bottom four rows of the ALU array.

The intermediate variables a, b, c, and d are combined to provide one data point as an output. The data point is provided as an output x(k+N/2) of the butterfly block 315. The output of step F is a next state of the data point, and should not be confused with the input previous state of the data point. The output comprises four 16-bit data words, although only two of the four 16-bit data words are shown. The four 16-bit data words include a low-order real part of x(k), a high-order real part of x(k), a low-order imaginary part of x(k), and a high-order imaginary part of x(k). The outputs are stored in CRAM bank 1.

Figure 8A:
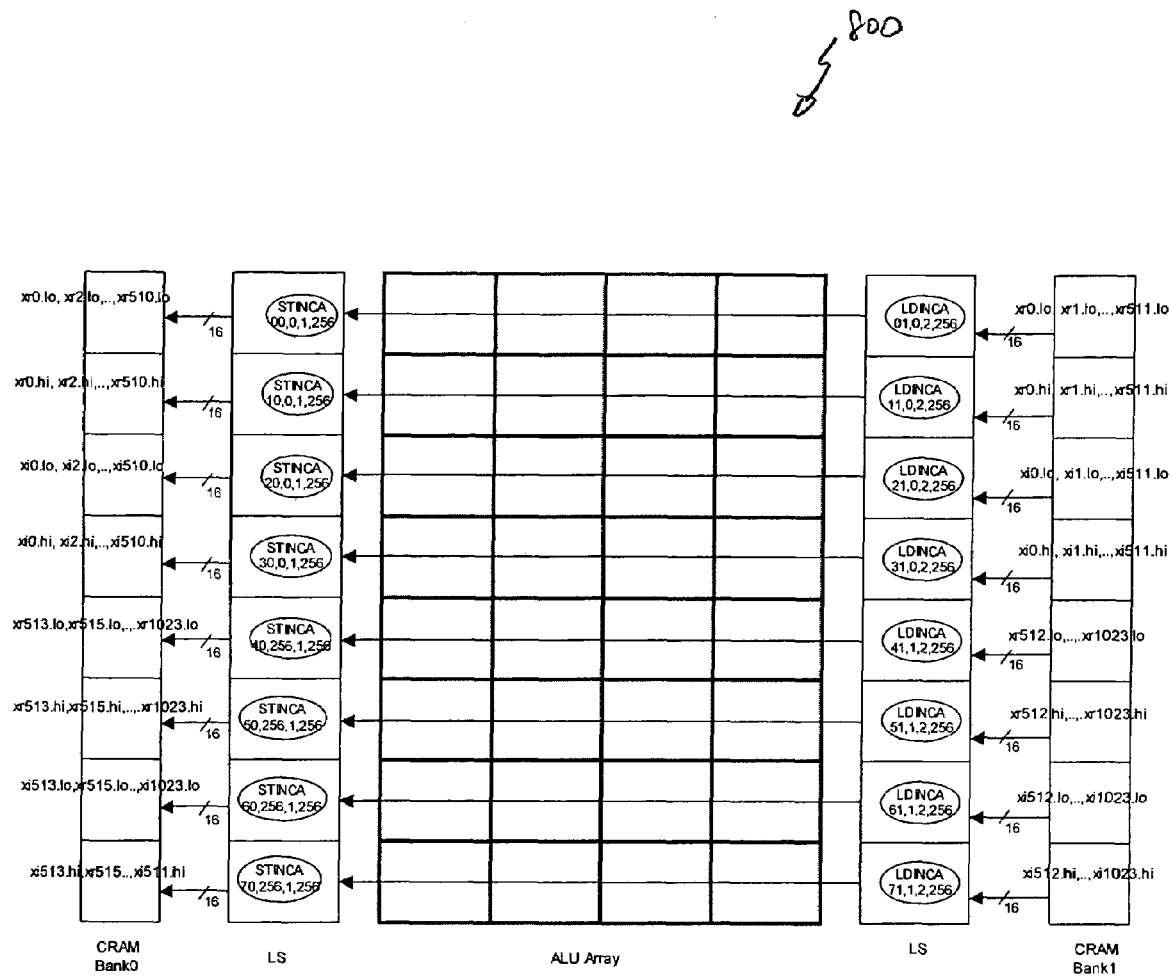
FIGS. 8A and 8B are a data flow graph of an exemplary N-point inverse shuffle, in accordance with an embodiment.
Figure 8B:
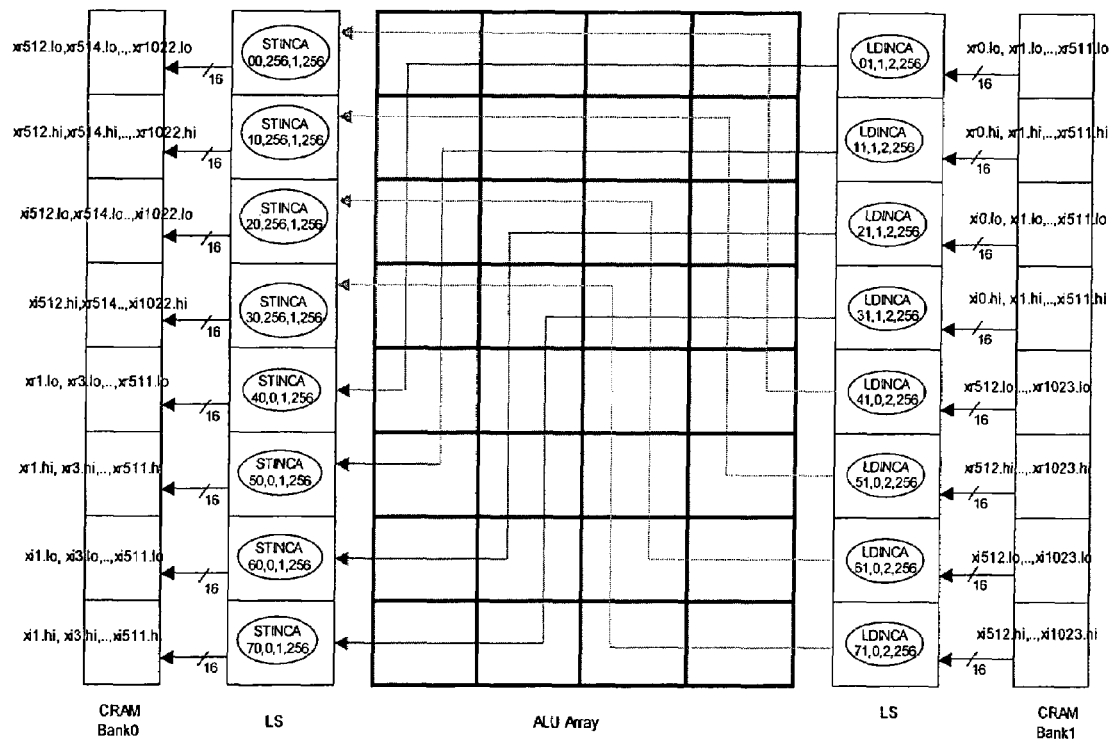

Step G—N-Point Inverse Shuffle:

FIGS. 8A and 8B show a data flow graph implementing the shuffle. In step (G), the N-point inverse shuffle is implemented.

In FIG. 8A, the data values in the even positions of the input sequence are placed in the first N/2 positions in the output sequence. When the data points provided to the butterfly from memory locations in CRAM bank 1 have even-numbered addresses, the array simply readdresses the data back to the CRAM bank 0 without manipulating the data points.

In FIG. 8B, the data values at odd positions of the input sequence are placed as data at second N/2 positions in the output sequence. When the data points provided to the butterfly from memory locations in CRAM bank 1 have odd-numbered addresses, the array simply readdresses the data values back to the CRAM bank 0 without manipulating the data points.

Contents of Local Memory Banks 0 and 1:

FIGS. 9 to 16 shows contents of the CRAM memory banks during each of the steps (A)-(G). Each CRAM at rows 0 to 7 of bank 0 store data points, x, for k=0, 1,2, . . . ,N/2−1, where N may equal 1024. Each row represents 512 16-bit words. Rows 8 and 9 of bank 0 and bank 1 store 512 weights. (It will be appreciated that the description and figures sometimes use xr, xi, wr, wi, ur, ui, . . . , etc. as a convenient form of $x_r$, $x_i$, $w_r$, $w_i$, $u_r$, $u_i$, . . . , etc. For example, xr(k+N/2) means $x_r$(k+N/2).)

FIG. 9 is a block diagram 900 showing bank 0 and bank 1, the banks storing data values for an initial N data points and weight constants before step (A) is implemented. Bank 0 stores a low-order real part of x(k), a high-order real part of x(k), a low-order imaginary part of x(k), a high-order imaginary part of x(k), a low-order real part of x(k+N/2), a high-order real part of x(k+N/2), a low-order imaginary part of x(k+N/2), and a high-order imaginary part of x(k+N/2). Bank 0 also stores the low-order part and high-order real part of the twiddle factor. Bank 1 stores the low-order part and high-order imaginary part of the twiddle factor.

Figure 10:
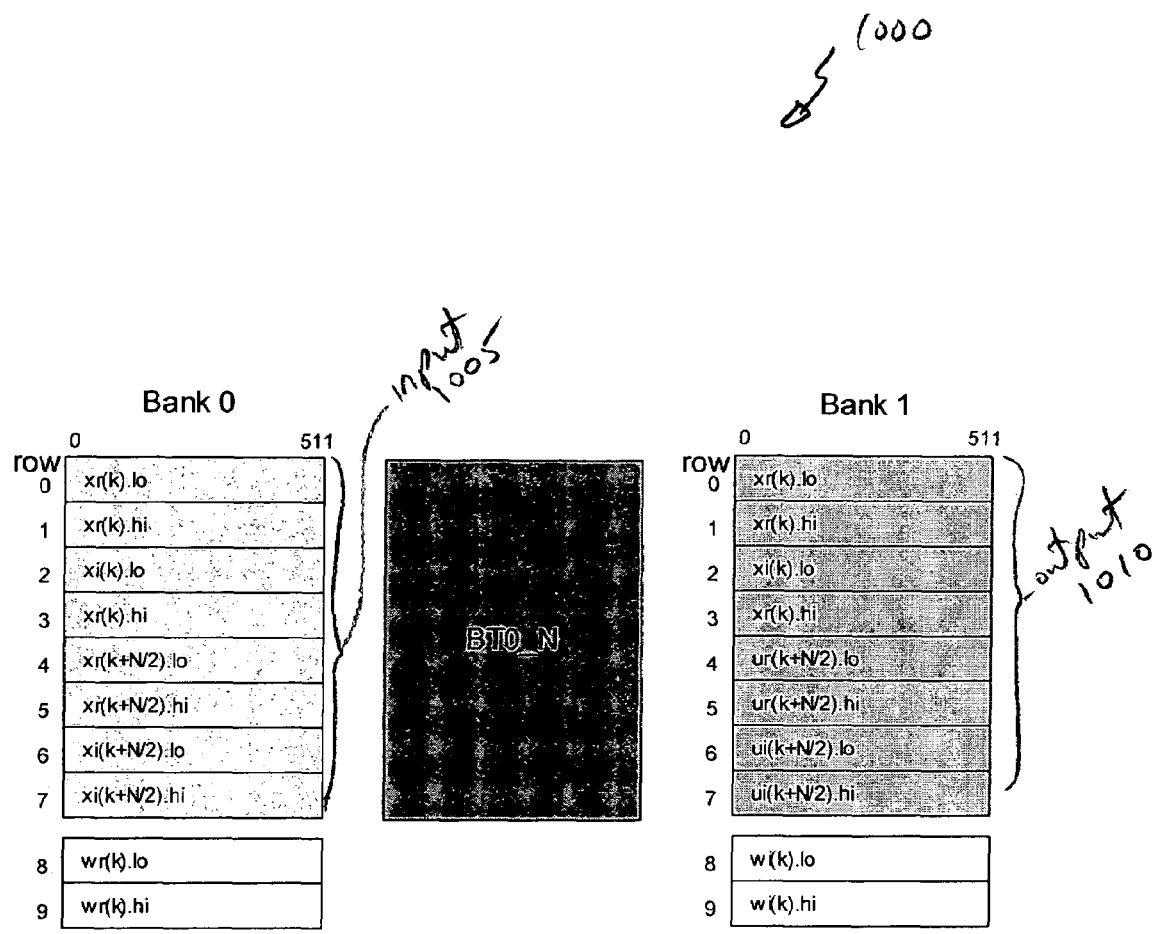
FIG. 10 is a block diagram illustrating the contents of two memory banks of local RAM at step A of FIG. 4, in accordance with an embodiment.

FIG. 10 is a block diagram 1000 illustrating bank 0, the ALU array mapped for $BT_0\_N$ operation and bank 1, the contents of memory banks 0 and 1 containing the values after step (A). Bank 0 shows the data values 1005 to be input to BT0_N array. Bank 1 shows the output data values 1010.

Figure 11:
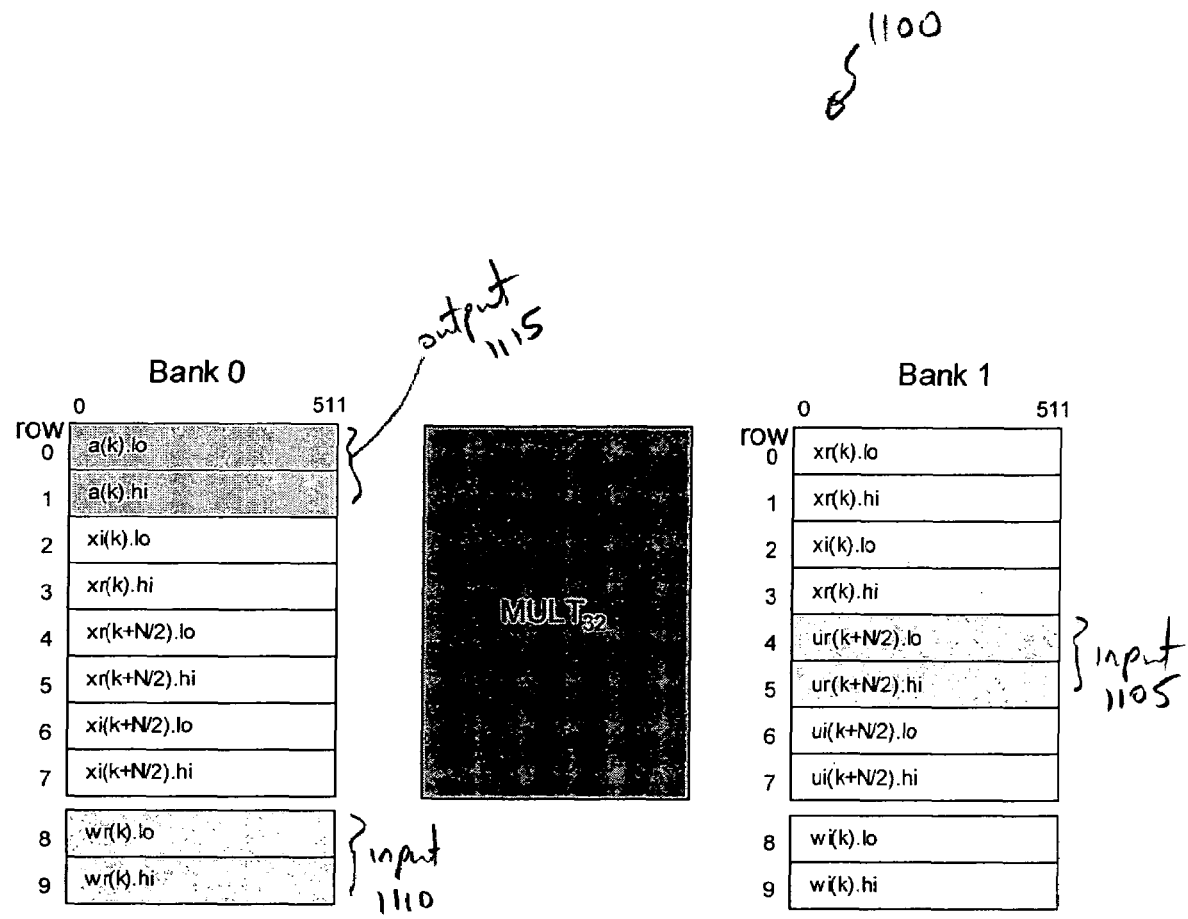
FIG. 11 is a block diagram illustrating the contents of two memory banks of local RAM at step B of FIG. 4, in accordance with an embodiment.

FIG. 11 is a block diagram 1100 illustrating bank 0, the ALU array mapped for MULT32 operation and bank 1, the contents of memory banks 0 and 1 containing the data values after step (B). For step (B), two data values 1105, namely, the low-order real intermediate values ur(k+N/2).lo and high-order real values ur(k+N/2).hi stored in bank 1 and the high-order and low-order real parts of the twiddle factors w(k) stored in bank 0 are used as input to MULT32. Two output values 1115 a (k) are shown stored in bank 0.

Figure 12:
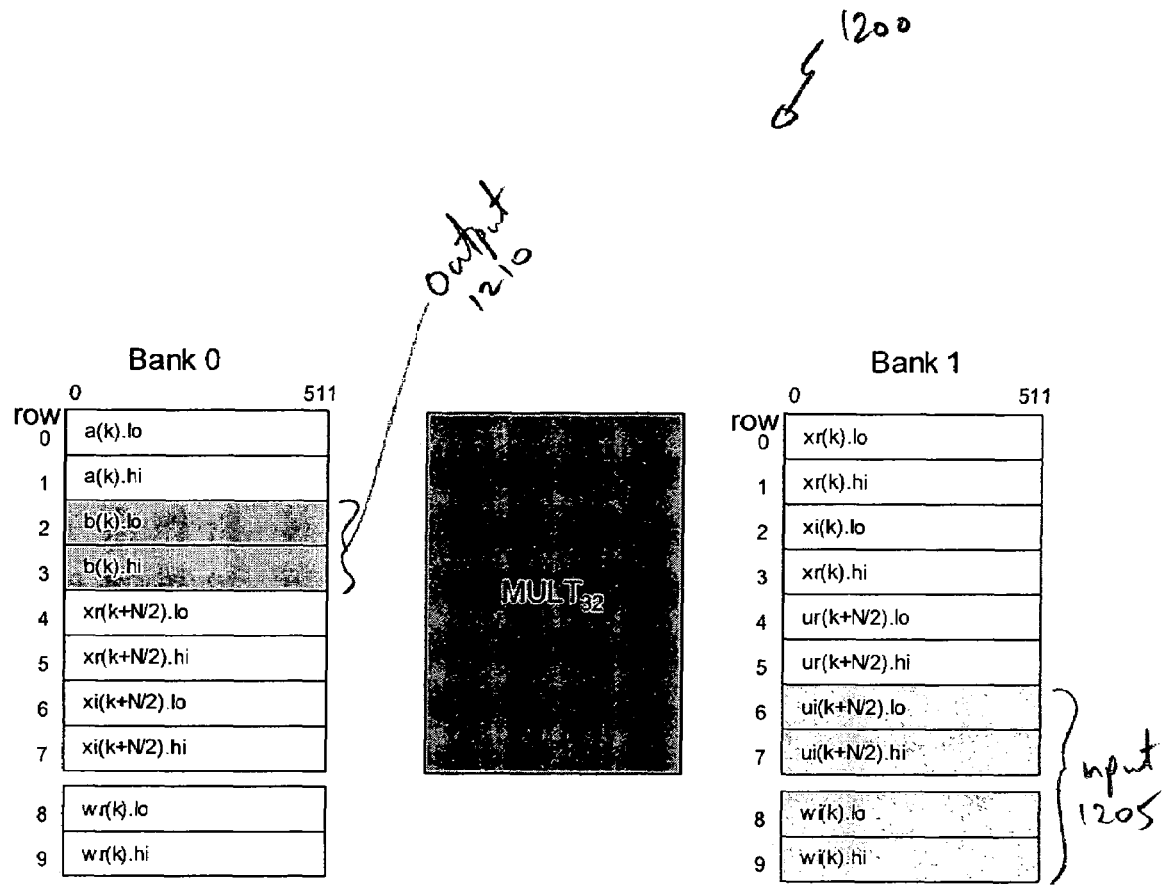
FIG. 12 is a block diagram illustrating the contents of two memory banks of local RAM at step C of FIG. 4, in accordance with an embodiment.

FIG. 12 is a block diagram 1200 illustrating bank 0, the ALU array mapped for MULT32 operation and bank 1, the contents of memory banks 0 and 1 containing the data values after step (C). For step (C), four data values 1205, namely, the low-order imaginary intermediate value ui(k+N/2).lo, the high-order imaginary intermediate value ui(k+N/2).hi, the low-order imaginary part twiddle factor wi(k).lo and the high-order imaginary part twiddle factor wi(k).hi in bank 1 are used as input to MULT32. Two output values 1210b(k) are stored in bank 1.

Figure 13:
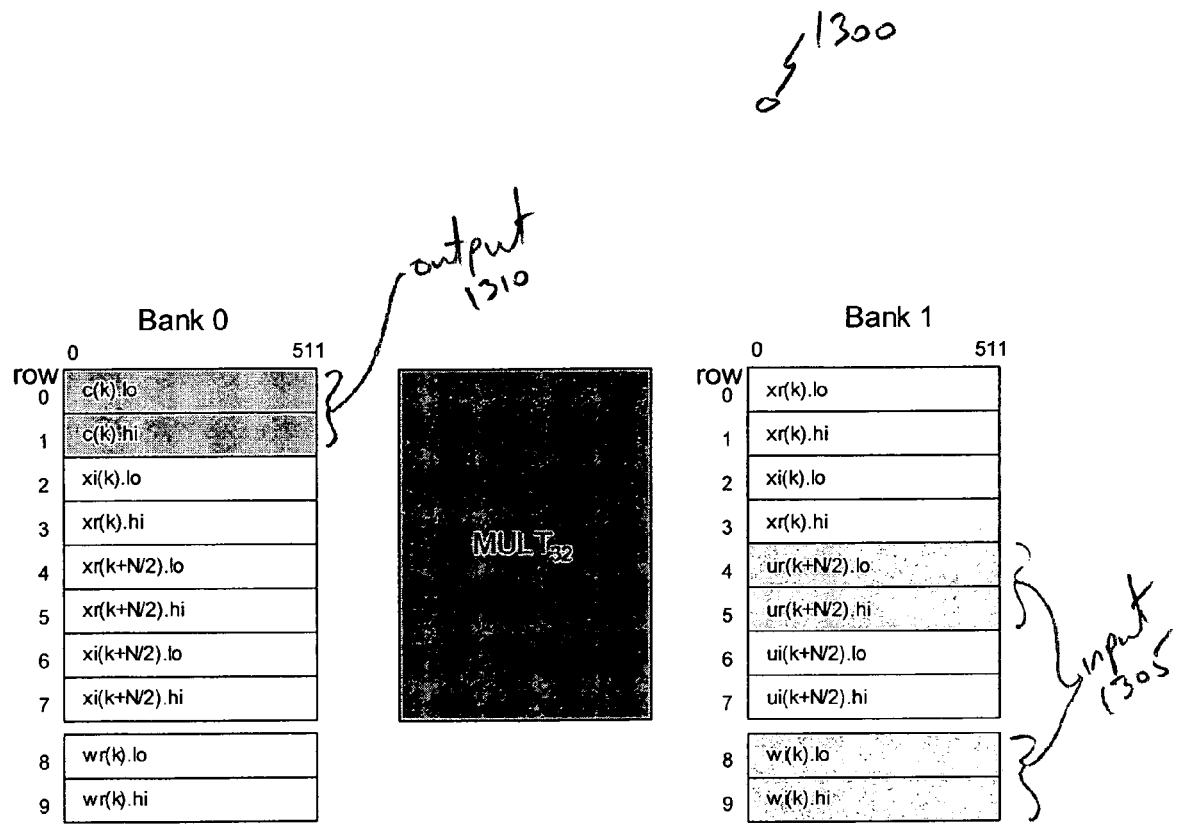
FIG. 13 is a block diagram illustrating the contents of two memory banks of local RAM at step D of FIG. 4, in accordance with an embodiment.

FIG. 13 is a block diagram 1300 illustrating bank 0, the ALU array mapped for MULT32 operation and bank 1, the contents of memory banks 0 and 1 containing the data values after step (D). For step (D), four data values 1305, namely, the low-order real intermediate value ur(k+N/2).lo, the high-order real intermediate value ur(k+N/2).hi, the low-order imaginary part twiddle factor wi(k).lo and the high-order imaginary part twiddle factor wi(k).hi in bank 1 are used as input to MULT 32. Two output values 1310 c (k) are stored in bank 1.

Figure 14:
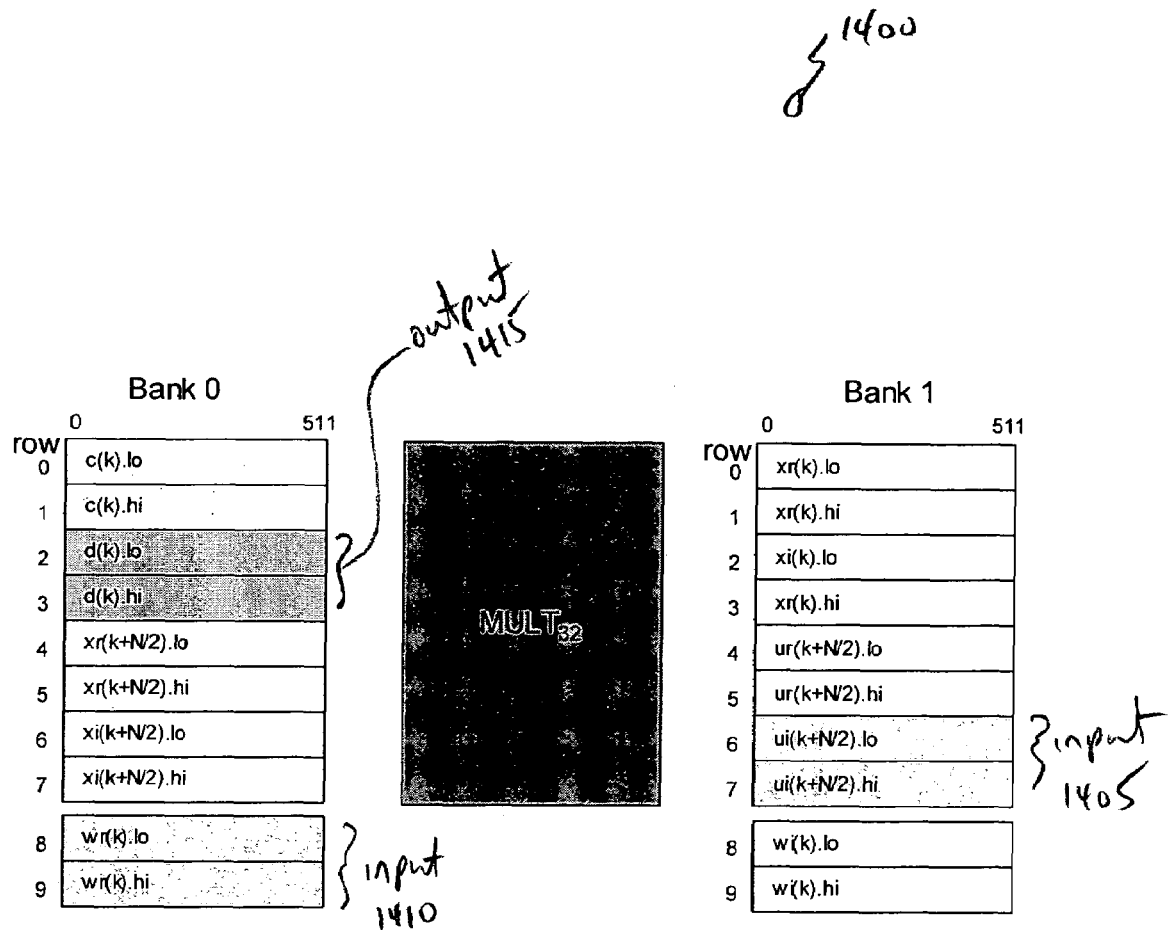
FIG. 14 is a block diagram illustrating the contents of two memory banks of local RAM at step E of FIG. 4, in accordance with an embodiment.

FIG. 14 is a block diagram 1400 illustrating bank 0, the ALU array configured for MULT 32 operation and bank 1, the contents of memory banks 0 and 1 containing the data values after step E. For step (E), two data values 1405, namely, low-order imaginary intermediate values ui(k+N/2).lo and high-order imaginary intermediate values ui(k+N/2).hi stored in bank 1 and the high-order and low-order real parts of the twiddle factors wr(k) stored in bank 0 are used as input to MULT32. Two output values 1415 d(k) are shown stored in bank 0.

Figure 15:
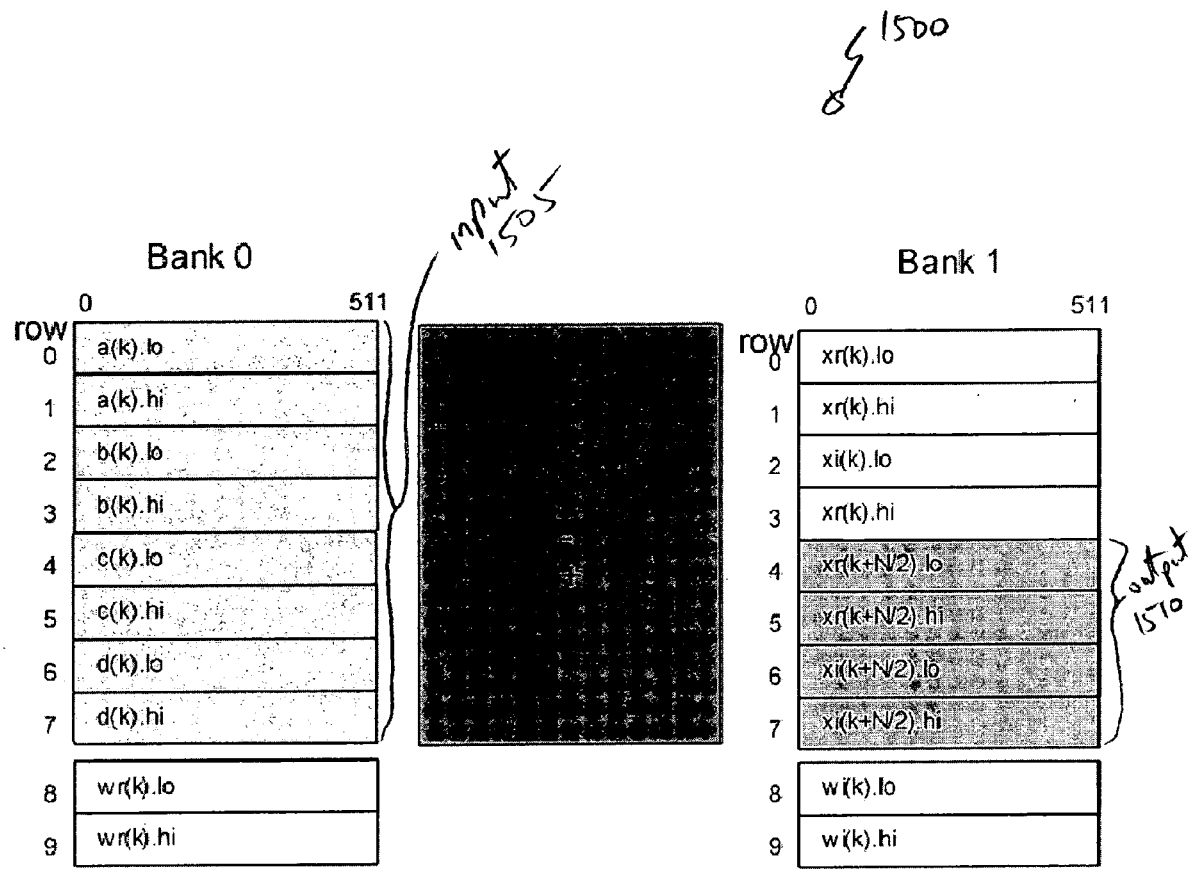
FIG. 15 is a block diagram illustrating the contents of two memory banks of local RAM at step F of FIG. 4, in accordance with an embodiment.

FIG. 15 is a block diagram 1500 illustrating bank 0, the ALU array configured for −+ operation, and bank 1, the contents of memory banks 0 and 1 containing the data values after step (F). For step (F), the eight high-order and low-order a, b, c and d values stored in bank 0 are used as input 1505 to the add/subtract array. Bank 1 stores the output 1510, namely, the high-order and low-order real and imaginary parts x(k+N/2).

Figure 16:
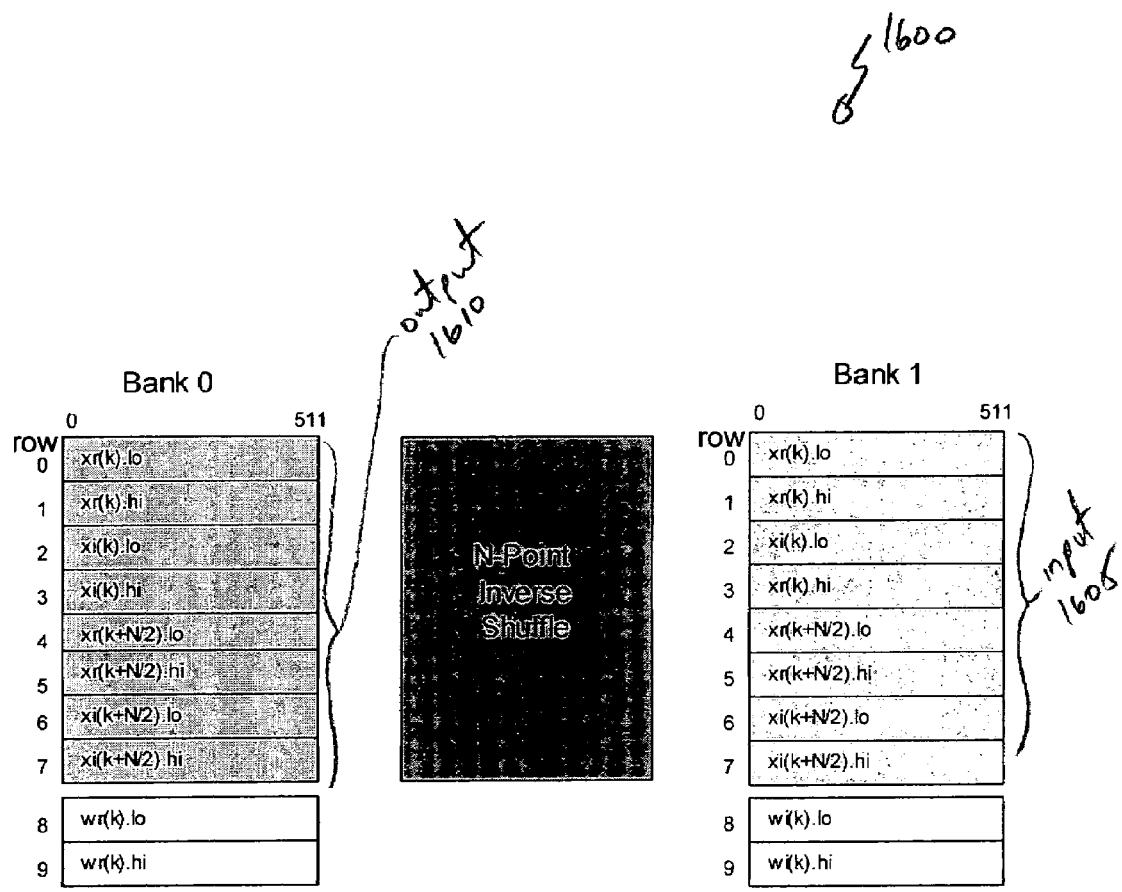
FIG. 16 is a block diagram illustrating the contents of two memory banks of local RAM at step G of FIG. 4, in accordance with an embodiment.

FIG. 16 is a block diagram illustrating bank 0, the ALU array mapped for N-point inverse shuffle operation, and bank 0, the contents of memory banks 0 and 1 containing the data values after step (G). Bank 1 stores the eight low order and high order, real and imaginary data values for the first N/2 and second N/2 data points as input to the N-point inverse shuffle array. Bank 0 stores the same values rearranged per the inverse shuffle routine.

Figure 17:
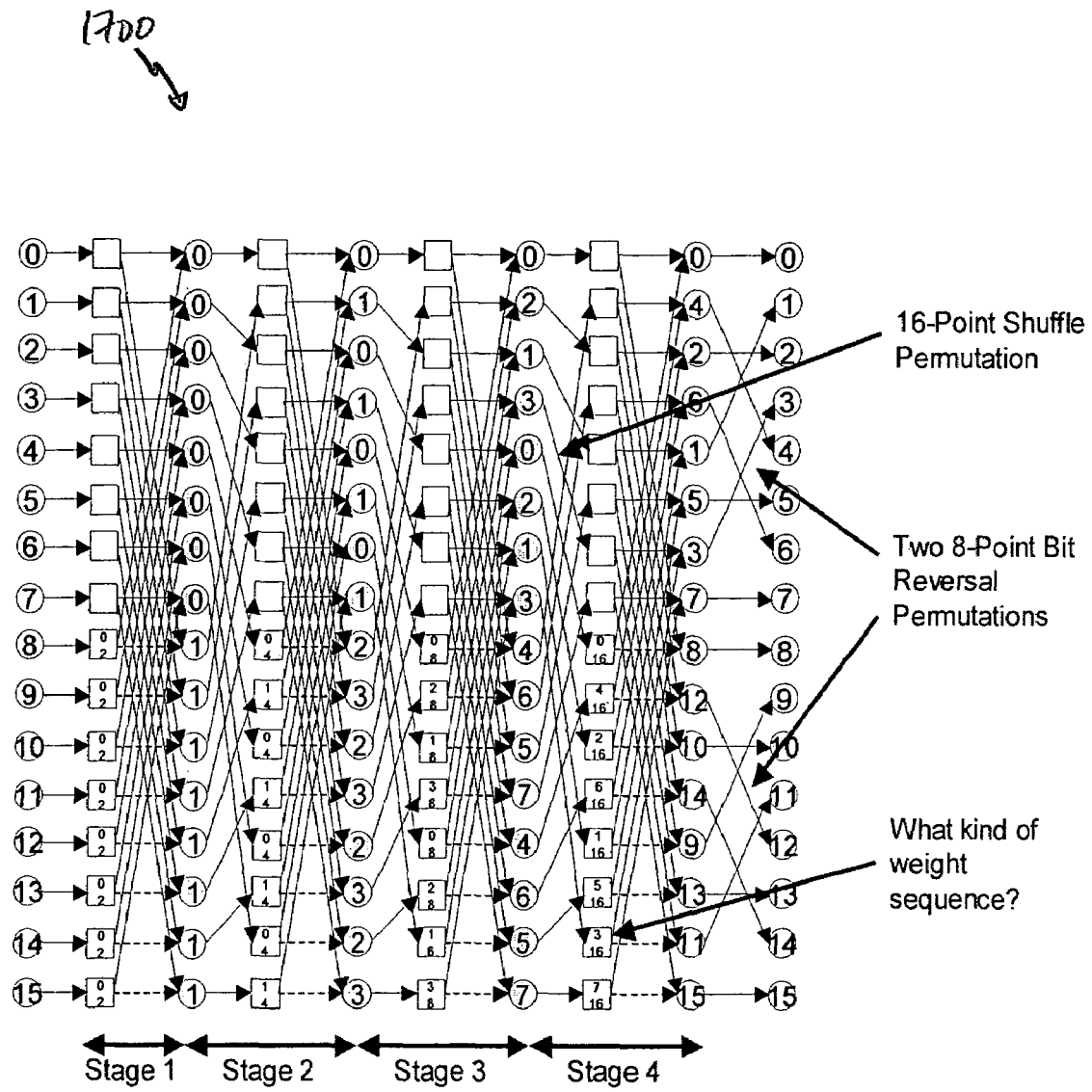
FIG. 17 is a data flow graph that shows a bit-sliced implementation of a 16-point FFT network, in accordance with an embodiment.

FIG. 17 shows an example flow graph 1700 for a 16-point FFT. Multiplications by complex weights are represented as square boxes (the numerals within the square being the complex weights), sign inversions are represented as dashed lines, and addition (subtraction) are performed at numeral-containing circles. The numeral within each circle assists with indexing the FFT sequence.

In stage 1, the data values at positions 8-15 are each multiplied by a weight, and a butterfly operation is performed on the results and data values at positions 0-7.

In stage 2, the positions are shuffled using a 16-point shuffle. Another butterfly operation is performed on the data values.

In stage 3, the positions are shuffled again using a 16-point shuffle. Another butterfly operation is performed on the data values.

In stage 4, the positions are shuffled again using a 16-point shuffle. Another butterfly operation is performed on the data values.

After stage 4, the data values are reordered in two 8-point bit reversal permutations. Using bit-reversal, new positions are obtained by reversing the bits in the binary representation of the initial positions, e.g., 110 to 011, 111 to 111, 100 to 001, etc.

FIG. 17 was achieved by manipulating the links to obtain the same link pattern for each stage, thus allowing construction of the pipeline of FIG. 3 to factor the bit reversal operation out of the loop (i.e. m−1 stages) and place it at the beginning of entire transformation. Since bit reversal can be done in host machine, the resulting sequence can be fed into the ALU array for processing as described herein.

In one embodiment input data for the zero-angle inverse butterfly step can be obtained from the first local memory bank, and output data arising from the zero-angle inverse butterfly step can be stored in the second local memory bank. In another embodiment, input data for the plurality of multiplication steps can be obtained from the second local memory bank, and output data arising from the plurality of multiplication steps can be stored in the first local memory bank. In such an embodiment, input data for the parallel subtraction and addition step can comprise the output from the plurality of multiplication steps. In such a case, this data can be obtained from the first local memory bank. Output data arising from the parallel subtraction and addition step can also be stored in the second local memory bank. In another embodiment, input data for the inverse N-point shuffle can be obtained from the second local memory bank, and output data arising from the inverse N-point shuffle can be stored in the first local memory bank. In such an embodiment, the inverse N-point shuffle can be performed in two phases including a first phase where data from even positions in the second local memory bank comprises the input data and a second phase where data from odd positions in the second local memory bank comprises the input data.

In the method for implementing a generic inverse butterfly and inverse N-point shuffle, a zero-angle inverse butterfly step of the generic inverse butterfly may first be performed using the reconfigurable ALU in a first configuration. Next, the reconfigurable ALU array may be reconfigured into a second configuration and used to perform plurality of multiplication steps of the generic inverse butterfly. Subsequently, the ALU array may be reconfigured a third time into a third configuration for performing a parallel addition and subtraction step of the generic inverse butterfly. Finally, the ALU may be reconfigured in a fourth configuration to perform the inverse N-point shuffle.

Please note that the inverse generic butterflies of FIG. 3 may include steps (A) to (F) of FIG. 4, and that the inverse N-point shuffle of FIG. 3 may include step (G) which has two configurations as shown in FIG. 8A and FIG. 8B. The inverse 0-angle butterflies of FIG. 3 may be the step (A) in FIG. 4. The inverse generic butterflies and Inverse N-point shuffle of FIG. 3 may form one stage of the IFFT operation, and these two operations get repeated for m−1 times. The final stage, stage m, executes BTN_0 operation, which is the inverse 0-angle butterflies.

Please also note that the ALU array as shown in FIG. 5 to FIG. 8B (i.e. 8 rows by 4 columns) includes 32 ALU cells. When the ALU array is configured and loaded, it is capable of pipelining and paralleling computation, since each ALU cell is doing some operation(s) which is configured for that cell. Therefore, in one embodiment, there are 32 ALU cells executing their designated instructions in parallel and there are sequences of data points input to the ALU array and executed for the giving configuration in every one clock cycle after initial latency for filling up the pipe. Thus, after all the ALU array is loaded, the output will be produced in every clock cycle.

Note that, in one embodiment of the 8×4 ALU array, a configuration (page) means a map of instructions for the 32 ALU cells to execute all at same clock cycle. In FIG. 4, each square box represents the same ALU array (which may have 8×4 cells), with different configuration for different operations: BT0_N, MUL32, add-sub, and N-Point Inverse Shuffle.

In one embodiment, steps (A) to (F) are each implemented in one configuration and step (G) is implemented in two configurations.

While various embodiments have been described, they have been presented by way of example only, and not limitation. Thus, the breadth and scope of any embodiment should not be limited by any of the above described exemplary embodiments, but should be defined only in accordance with the following claims and their equivalents.

The invention claimed is:

1. A system, comprising:
   first and second local memory banks; and
   a reconfigurable arithmetic logic unit (ALU) array coupled to the local memory banks, the ALU array having a plurality of configurations, including:
   a first configuration for performing an inverse butterfly operation;
   a second configuration for performing a multiplication operation;
   a third configuration for performing parallel subtraction and addition; and
   a fourth configuration for performing an inverse N-point shuffle.

2. The system of claim 1, wherein the ALU array obtains the input data for the inverse butterfly operation from the first local memory bank and stores output data in the second local memory bank.

3. The system of claim 1, wherein the ALU array obtains the input data for the multiplication operation from the second local memory bank and stores the output data in the first local memory bank.

4. The system of claim 1, wherein the ALU array obtains the input data for the parallel subtraction and addition operation from the first local memory bank and stores the output data in the second local memory bank.

5. The system of claim 1, wherein the ALU array obtains the input data for the inverse N-point shuffle from the second local memory bank and stores the output data in the first local memory bank.

6. The system of claim 1, further comprising a bit reversal block.

7. A method, comprising:
   using an ALU array in a first configuration to perform an inverse butterfly operation;
   using the ALU array in a second configuration to perform a multiplication operation;
   using the ALU array in a third configuration to perform a parallel addition and subtraction operation; and
   using the ALU array in a fourth configuration to perform an inverse N-point shuffle.

8. The method of claim 7, further comprising obtaining input data for the inverse butterfly operation from the first local memory bank and storing output data in the second local memory bank.

9. The method of claim 7, further comprising obtaining input data for the multiplication operation from the second local memory bank and storing output data in the first local memory bank.

10. The method of claim 7, further comprising obtaining input data for the parallel subtraction and addition operation from the first local memory bank and storing output data in the second local memory bank.

11. The method of claim 7, further comprising obtaining input data for the inverse N-point shuffle from the second local memory bank and storing output data in the first local memory bank.

12. The method of claim 7, further comprising performing a bit reversal.

13. A system, comprising:
   means for using an ALU array in a first configuration to perform an inverse butterfly operation;
   means for using the ALU array in a second configuration to perform a multiplication operation;
   means for using the ALU array in a third configuration to perform a parallel addition and subtraction operation; and
   means for using the ALU array in a fourth configuration to perform an inverse N-point shuffle.

* * * * *